(12) United States Patent
Odahara et al.

(10) Patent No.: US 9,163,604 B2
(45) Date of Patent: Oct. 20, 2015

(54) ENGINE STARTING DEVICE AND ENGINE STARTING METHOD

(71) Applicants: Kazuhiro Odahara, Chiyuda-ku (JP); Koichiro Kamei, Chiyoda-ku (JP); Masami Abe, Chiyoda-ku (JP)

(72) Inventors: Kazuhiro Odahara, Chiyuda-ku (JP); Koichiro Kamei, Chiyoda-ku (JP); Masami Abe, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 386 days.

(21) Appl. No.: 13/717,996

(22) Filed: Dec. 18, 2012

(65) Prior Publication Data

US 2013/0180490 A1 Jul. 18, 2013

(30) Foreign Application Priority Data

Jan. 18, 2012 (JP) ................................ 2012-007651

(51) Int. Cl.
*F02N 15/00* (2006.01)
*F02N 11/08* (2006.01)

(52) U.S. Cl.
CPC ............ *F02N 15/00* (2013.01); *F02N 11/0844* (2013.01); *F02N 11/0855* (2013.01); *F02N 2250/04* (2013.01); *Y02T 10/48* (2013.01)

(58) Field of Classification Search
CPC ... F02D 41/042; F02D 41/062; F02D 41/065; F02D 2013/0292; F02N 11/0803; F02N 11/0814; F02N 11/0855
USPC ................. 123/179.3, 179.4, 179.14, 179.28; 701/107, 110, 113, 114
See application file for complete search history.

(56) References Cited

U.S. PATENT DOCUMENTS

| 7,681,545 | B2 * | 3/2010 | Taki et al. ................... 123/179.3 |
| 2004/0214689 | A1 * | 10/2004 | Kaneko ......................... 477/203 |
| 2006/0157023 | A1 * | 7/2006 | Matsuki et al. .......... 123/339.16 |

(Continued)

FOREIGN PATENT DOCUMENTS

| CN | 1878950 A | 12/2006 |
| CN | 101852160 A | 10/2010 |

(Continued)

OTHER PUBLICATIONS

Preliminary Notice of Reasons for Rejection, dated Apr. 2, 2013, Patent Application No. 2012-007651.
Communication dated Dec. 2, 2014, issued by the State Intellectual Property Office of P.R. China in counterpart Chinese application No. 201310003579.2.

*Primary Examiner* — John Kwon
*Assistant Examiner* — Johnny H Hoang
(74) *Attorney, Agent, or Firm* — Sughrue Mion, PLLC; Richard C. Turner

(57) ABSTRACT

Engine starting device, including: a crank signal generation unit (13); and an engine control unit (10) for identifying a predetermined crank position of a crankshaft, and starting the engine, in which the engine control unit estimates, in a course of stopping the engine when a stop condition for the engine is established, based on an engine rpm at the identified predetermined crank position, whether or not the engine rotates backward before reaching the predetermined crank position for a next time, and after estimating that the engine rotates backward, sets an inhibition range which is prescribed from a starter drive inhibition start timing to a starter drive inhibition reset timing, and a permission range which is other than the inhibition range, and when the restart condition is established during rotation of the engine, inhibits restart in the inhibition range and carries out the restart in the permission range.

13 Claims, 9 Drawing Sheets

(56) References Cited

U.S. PATENT DOCUMENTS

| | | | |
|---|---|---|---|
| 2009/0138184 A1* | 5/2009 | Terada | 701/112 |
| 2010/0180849 A1* | 7/2010 | Senda et al. | 123/179.4 |
| 2011/0017165 A1* | 1/2011 | Osawa et al. | 123/179.4 |
| 2011/0144891 A1* | 6/2011 | Nakamura et al. | 701/104 |
| 2011/0146609 A1* | 6/2011 | Enoki | 123/179.3 |
| 2011/0184626 A1* | 7/2011 | Mauritz et al. | 701/102 |
| 2011/0218729 A1* | 9/2011 | Takahashi | 701/113 |
| 2011/0239974 A1* | 10/2011 | Shoda et al. | 123/179.4 |
| 2012/0071298 A1* | 3/2012 | Morita | 477/167 |
| 2012/0295759 A1* | 11/2012 | Fujiwara | 477/167 |

FOREIGN PATENT DOCUMENTS

| | | |
|---|---|---|
| JP | 2005-140030 A | 6/2005 |
| JP | 2005-146875 A | 6/2005 |
| JP | 2006-183467 A | 7/2006 |
| JP | 2008-133792 A | 6/2008 |
| JP | 2010-084754 A | 4/2010 |
| JP | 2010-190208 A | 9/2010 |
| JP | 2011-140939 A | 7/2011 |

* cited by examiner

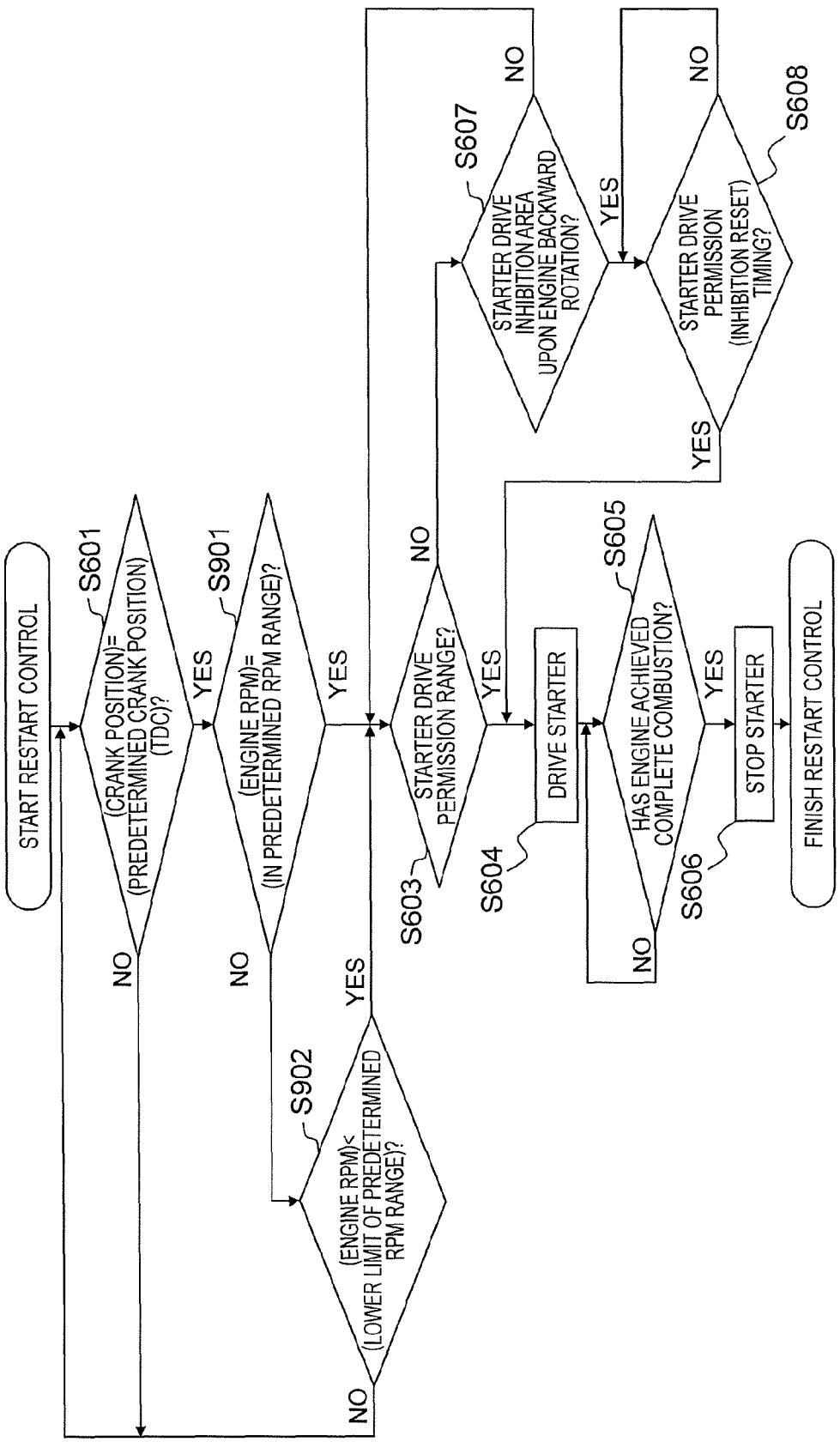

ENGINE STARTING DEVICE AND ENGINE STARTING METHOD

BACKGROUND OF THE INVENTION

1. Field of the Invention

The present invention relates to an engine starting device and an engine starting method for an automatic idle-stop system for performing an engine idle stop when a predetermined idle-stop condition is satisfied and restarting an engine when a restart condition is thereafter satisfied.

2. Description of the Related Art

For the purposes of improving fuel efficiency and reducing an environmental load of automobiles, there have heretofore been developed automatic idle-stop systems for automatically performing an idle stop with the satisfaction of a predetermined condition.

However, when a restart request for an engine is generated while the engine is rotating backward, and the engine is started by the starter motor, the starter motor causes the engine, which is rotating backward, to rotate forward and an excessively large load acts on the starter motor. In view of this, there is known a configuration for detecting, by backward rotation detection means for detecting whether or not the engine is rotating backward, a backward rotation when the engine is rotating backward for some reason, inhibiting drive of the starter motor, and preventing the starter motor and a power transmission mechanism thereof from being damaged (for example, refer to Japanese Patent Application Laid-open No. 2005-140030).

However, the conventional technology has the following problem.

As described above, the invention according to Japanese Patent Application Laid-open No. 2005-140030 includes the backward rotation detection means for detecting whether or not the engine is rotating backward, and the means for inhibiting, when a backward rotation is detected, the motor from rotating, thereby preventing, when the engine is rotating backward, the motor from rotating. However, with the invention according to Japanese Patent Application Laid-open No. 2005-140030, it is necessary to provide the backward rotation detection means for detecting the backward rotation of the engine, and there thus poses a problem in that the device becomes complex and the cost increases.

SUMMARY OF THE INVENTION

The present invention has been made in view of above-mentioned problem, and therefore has an object to provide an engine starting device and an engine starting method for enabling restart of an engine earlier without directly detecting a backward rotation of the engine.

According to an exemplary embodiment of the present invention, there is provided an engine starting device, including: crank signal generation means for outputting a crank signal including information indicating a reference position of a crankshaft of an engine; and engine control means for identifying, by determining the reference position based on the crank signal received from the crank signal generation means, a predetermined crank position of the crankshaft, and after stopping the engine when a stop condition for the engine is established, starting the engine when an engine restart condition is established, in which the engine control means estimates, in a course of stopping the engine when the stop condition for the engine is established, based on an engine rpm at the identified predetermined crank position, whether or not the engine rotates backward before reaching the predetermined crank position for a next time, and after estimating that the engine rotates backward, sets an inhibition range which is prescribed from a starter drive inhibition start timing to a starter drive inhibition reset timing, and a permission range which is other than the inhibition range, and when the restart condition is established during rotation of the engine, inhibits restart in the inhibition range and carries out the restart in the permission range.

According to another exemplary embodiment of the present invention, there is also provided an engine starting method to be applied to an engine starting device, the engine starting device including: crank signal generation means for outputting a crank signal including information indicating a reference position of a crankshaft of an engine; and engine control means for identifying, by determining the reference position based on the crank signal received from the crank signal generation means, a predetermined crank position of the crankshaft, and after stopping the engine when a stop condition for the engine is established, starting the engine when an engine restart condition is established, the engine starting method including: estimating, by the engine control means, in a course of stopping the engine when the stop condition for the engine is established, based on an engine rpm at the identified predetermined crank position, whether or not the engine rotates backward before reaching the predetermined crank position for a next time; after estimating that the engine rotates backward, setting, by the engine control means, an inhibition range which is prescribed from a starter drive inhibition start timing to a starter drive inhibition reset timing, and a permission range which is other than the inhibition range; and in the course of stopping the engine when the stop condition for the engine is established, when the restart condition is established during rotation of the engine, inhibiting, by the engine control means, restart in the inhibition range and carrying out the restart in the permission range.

According to the exemplary embodiments of the present invention, it is possible to provide the engine starting device and the engine starting method for enabling, by estimating, based on the rpm at the predetermined crank position of the engine, whether or not the engine rotates backward before the arrival at the next predetermined crank angle, the control of inhibiting, before occurrence of the engine backward rotation state, the drive of the starter, to thereby enable restart of the engine earlier without directly detecting the backward rotation of the engine.

BRIEF DESCRIPTION OF THE DRAWINGS

In the accompanying drawings:

FIG. 9 is a flowchart illustrating engine restart control performed when the engine is stopping according to the second embodiment of the present invention.

DETAILED DESCRIPTION OF THE PREFERRED EMBODIMENTS

Figure 1:
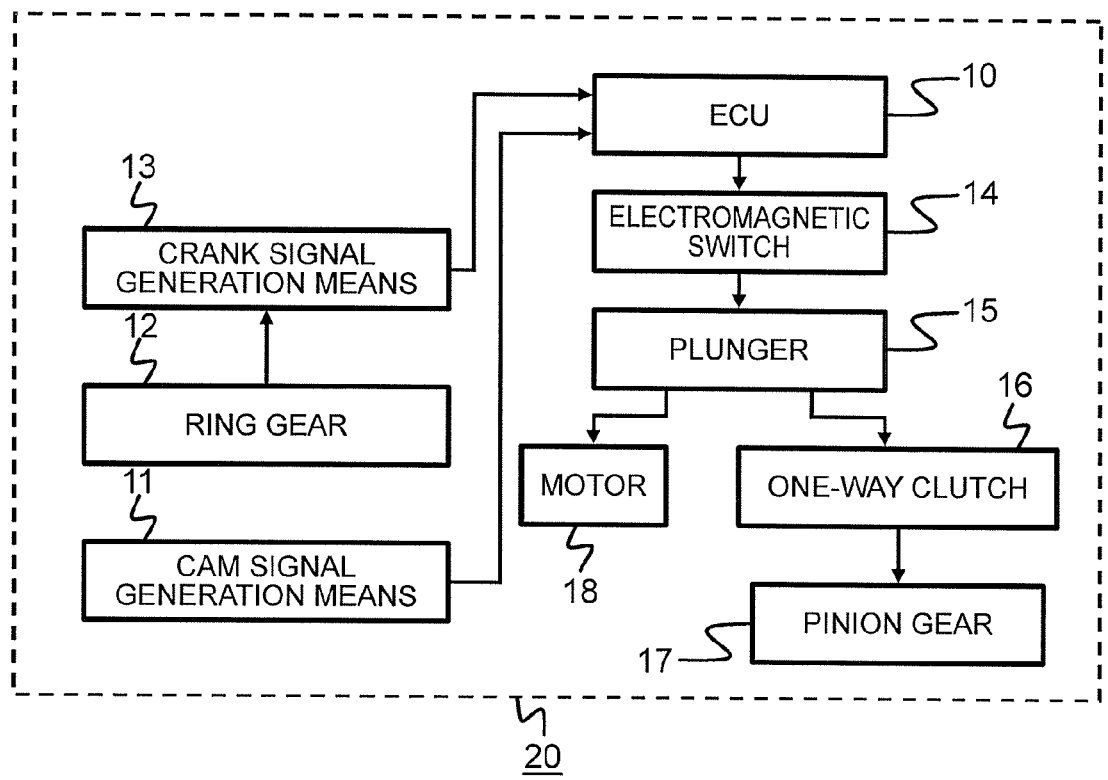
FIG. 1 is a block diagram illustrating a schematic configuration of an engine starting device according to a first embodiment of the present invention.

A description is now given of preferred embodiments of an engine starting device and an engine starting method according to the present invention referring to the drawings. In the following, a description is given of an example in which the engine starting device according to the present invention is applied to a three-cylinder engine.

First Embodiment

1. Description of Terms

First, a description is given of terms used in the present invention.

An "engine" for which the engine starting device is used is an engine such as a gasoline engine or a diesel engine which combusts or burns a fuel in a combustion chamber in each cylinder, and uses a power generated thereby to operate a piston. Generally, an engine used for a motor vehicle or the like has a configuration for converting a reciprocal motion of the piston, via a crankshaft or the like, into a rotational motion. It should be understood that if the engine starting device according to the present invention is used for the engine, the type of a fuel, the number or the volume of the cylinders, the number of cycles, and the like are not limited in any way.

A "starter" in the engine starting device includes a pinion gear for meshing with a ring gear of the engine, and includes a configuration for, only upon the start, moving the pinion gear, to mesh the engine ring gear and the pinion gear with each other, transmitting a rotational force of a motor to the engine, and releasing, when the engine once starts, the meshing between the pinion gear and the engine ring gear.

When the engine is to be started, for example, the starter is driven by an electric power of a battery or other such power, the pinion gear is meshed with the engine ring gear to drive the motor, and the rotational force of the motor is transmitted from the pinion gear via the ring gear of the engine to the crankshaft of the engine, thereby mechanically starting and rotating the engine.

During this rotation, the engine control means determines, from the crank signal and the cam signal, a crank position and a cylinder, and the engine starts the fuel intake, compression, combustion, and exhaust strokes. Thereafter, the engine no longer requires the starter device, and, while spontaneously repeating these strokes, continues the rotation until a stop command is generated.

Further, in the engine starting device, the phrase "case where the engine is rotating backward" refers to a case where the engine is rotating in a direction different from a rotation direction (forward rotation) provided by the starter according to the present invention. Generally, when the engine is spontaneously rotating, the backward rotation is not generated, but, in an engine stop process, particularly, immediately after the engine stops, the engine can physically rotate in any one of the directions, and the backward rotation can thus be generated.

2. Overall Configuration of Engine Starting Device according to Embodiment

Figure 2:
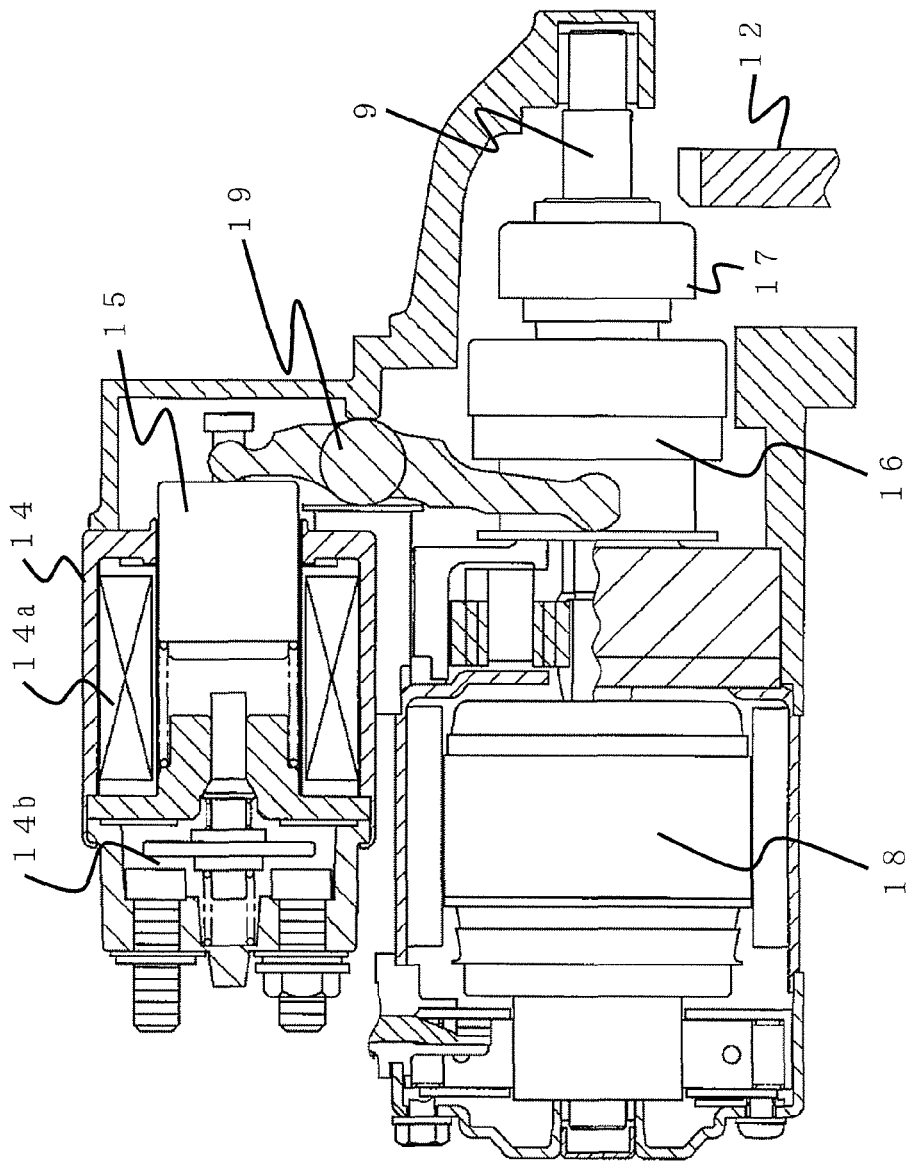
FIG. 2 is a cross-sectional view illustrating a starter which is a component of the engine starting device according to the first embodiment of the present invention.

FIG. 1 is a block diagram illustrating a schematic configuration of the engine starting device according to the first embodiment of the present invention. Moreover, FIG. 2 is a cross-sectional view illustrating the starter which is a component of the engine starting device according to the first embodiment of the present invention.

The engine starting device 20 according to this embodiment includes engine control means 10 (ECU 10), cam signal generation means 11, a ring gear 12, crank signal generation means 13, an electromagnetic switch 14, a plunger 15, a one-way clutch 16, a pinion gear 17, and a motor 18.

The engine control means 10 controls power supply to the electromagnetic switch 14. The plunger 15 is attracted by supplying electric power to the coil 14a of the electromagnetic switch 14, thereby moving a pinion gear 17 via a lever 19 engaged with the plunger 15, and meshing the pinion gear 17 with the ring gear 12.

Moreover, the movement of the plunger 15 closes a contact 14b constituted inside the electromagnetic switch 14. Accordingly, the power is supplied to the motor 18, the pinion gear 17 is rotated, and a driving force of the motor 18 is transmitted to the engine. The one-way clutch 16 is coupled to an output shaft 9, and, when a torque is input from the ring gear 12, freely rotates.

3. Regarding Detection of Crank Signal

Figure 3:
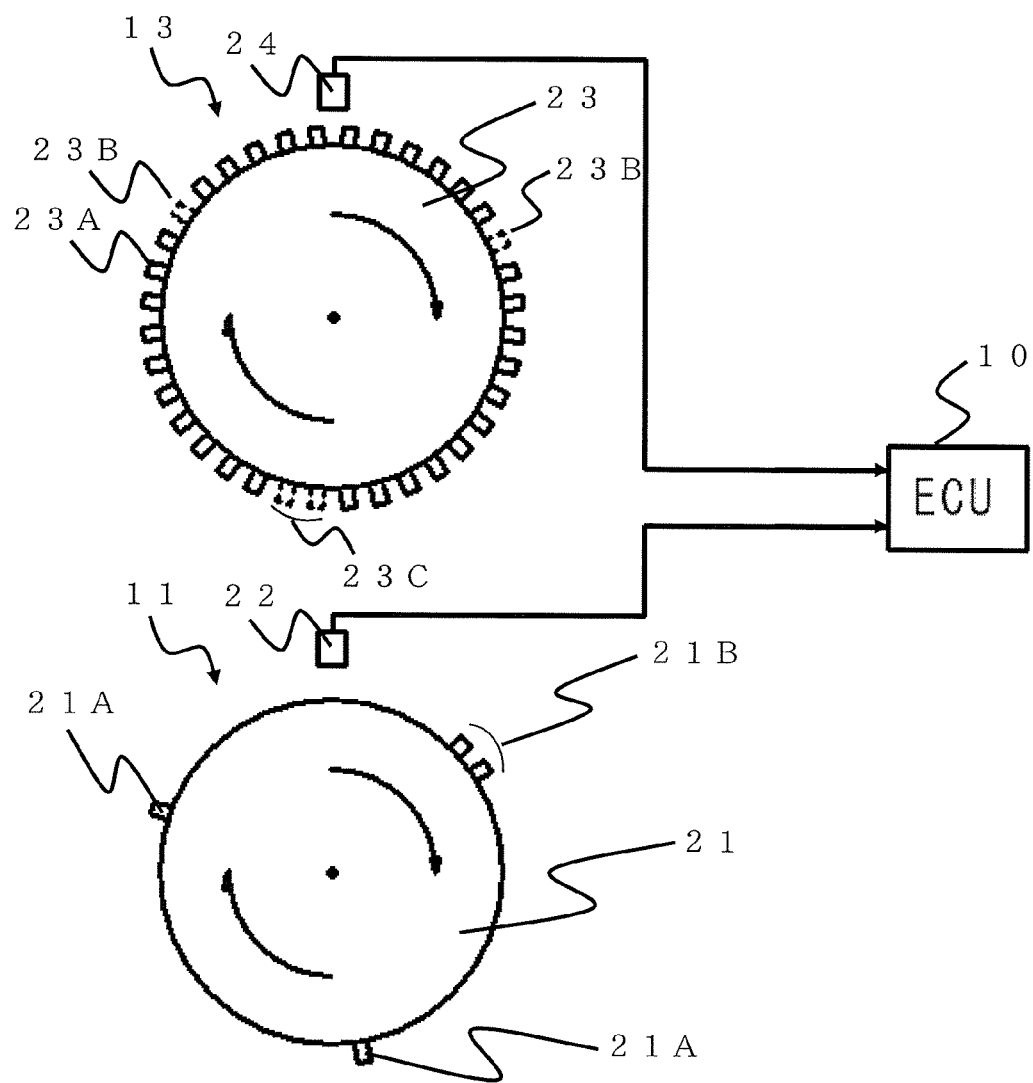
FIG. 3 is a schematic diagram of a crank angle detection device according to the first embodiment of the present invention.

FIG. 3 is a schematic diagram of a crank angle detection device according to the first embodiment of the present invention, and illustrates a specific configuration of the cam signal generation means 11 and the crank signal generation means 13. An internal combustion engine (not shown) includes a crankshaft (not shown), cam shafts (not shown) provided with cams for opening/closing intake valves (not shown) and exhaust valves (not shown) which are provided on the combustion chamber, transmission means (not shown) for transmitting the rotation of the crankshaft to the cam shafts, injectors (not shown) for supplying a fuel, ignition plugs (not shown), and the like. Note that, the cam shaft is reduced in speed by the transmission means to a ½ angular velocity of that of the crankshaft, and rotates synchronously with the crankshaft.

Then, the internal combustion engine according to the first embodiment is a four-cycle type engine repeating respective strokes in the order of the intake stroke, the compression stroke, the combustion stroke, and the exhaust stroke. Moreover, the respective cylinders combust at an equal interval of 240 degrees in terms of the rotation angle of the crankshaft.

The crank signal generation means 13 includes a rotation body 23 in a gear shape for rotating in synchronization with the crankshaft (not shown) at the same angular velocity as the crankshaft, a pickup 24 for detecting a large number of tooth portions 23A formed on an outer periphery of the rotation body 23 and outputting a signal such as a rectangular wave, and the like.

Figure 4:
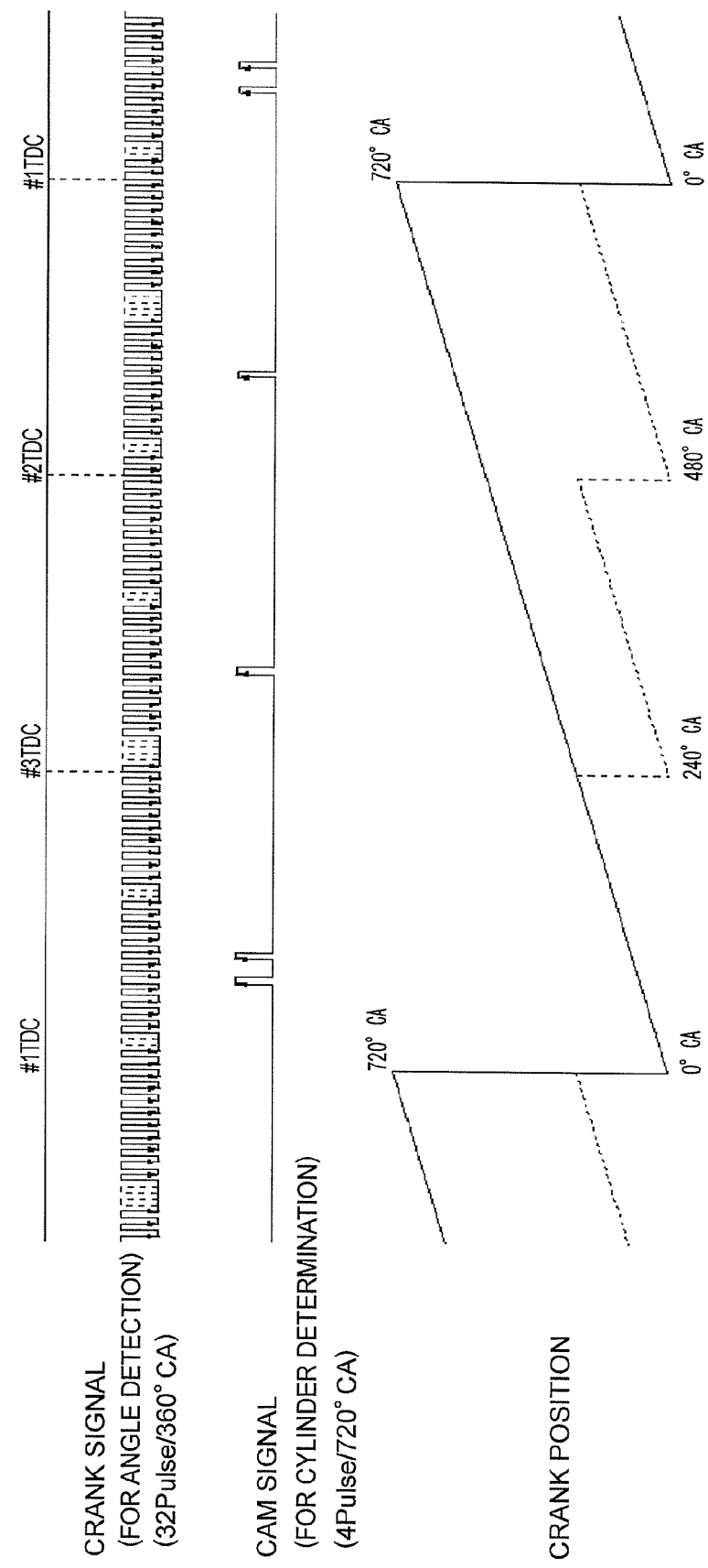
FIG. 4 is a chart illustrating timings of a crank signal and a cam signal according to the first embodiment of the present invention.

FIG. 4 is a chart illustrating timings of the crank signal and the cam signal according to the first embodiment of the present invention. The pickup 24 outputs, by outputting an ON signal when the tooth portion 23A comes closest to the pickup 24, and outputting an OFF signal when the tooth portion 23A departs from the pickup 24, thereby outputting the rectangular signal (corresponding to a pulse train signal), and the signal is input to the engine control means 10.

Moreover, on the outer periphery of the rotation body 23, approximately over the entire range, the tooth portions 23A are provided at an equal interval, but blank tooth portions 23B and 23C are partially provided (the blank tooth portions of the crank signal are hereinafter referred to as reference positions, and the blank tooth portions 23B and 23C correspond to information indicating the reference positions). According to the first embodiment, the outer periphery of the rotation body 23 is equally divided into 36 portions, and 32 tooth portions 23A, the blank tooth portions 23B corresponding to one tooth at two locations, and the blank tooth portion 23C corresponding to two teeth at one location are provided.

Therefore, in regions in which the tooth portions 23A are provided at the equal interval, while the ON signal or the OFF signal is output at each predetermined rotation angle (according to the first embodiment, 10 degrees, and this angle is hereinafter referred to as reference step angle), in the blank tooth portions 23B and 23C, a time during which the ON signal or the OFF signal is output is a time corresponding to twice or three times of the reference step angle.

Moreover, the number of the ON signals or the OFF signals which are output between the blank teeth while the rotation body 23 is rotating is known. Thus, the engine control means 10 carries out count at a time point when the OFF signal changes to the ON signal or at a time point when the ON signal changes to the OFF signal, and can calculate, from a time interval (corresponding to a pulse train interval) of the timings of the crank signal, the cycle (corresponding to a cycle of the positions of the crankshaft identified by the blank tooth portions 23B and 23C) of the crank signal, thereby determining the rpm of the engine as well.

The engine control means 10 can more precisely acquire the engine rpm by calculating, based on a change rate of the cycle of the crank signal, the engine rpm between the crank signals.

Further, the engine control means 10 may acquire the engine rpm by switching between the case of calculating the engine rpm from the time interval of the crank signal and the case of calculating the engine rpm between the crank signals based on the change rate of the cycle of the crank signal, based on the position of the crank. This configuration can reduce a calculation error in the rpm in a neighborhood of an inflection point of the engine rpm.

4. Regarding Cylinder Determination

In the internal combustion engine according to the first embodiment, the timing for injecting the fuel is determined considering, as a reference, the top dead center of the piston in the transition from the compression stroke to the combustion stroke. In the 4-cycle internal combustion engine, the each stroke is repeated in the sequence of the intake stroke→the compression stroke→the combustion stroke→the exhaust stroke, in which the each stroke corresponds to 180 degrees in the crank position angle as a unit. Therefore, based only on the crank position, whether or not the piston of each cylinder is in the compression stroke or the exhaust stroke cannot be determined.

Thus, the engine control means 10 uses, for the cylinder determination, the signal from the cam signal generation means 11. As illustrated in FIG. 3, the cam signal generation means 11 includes a second rotation body 21 in a gear shape for rotating at the same angular velocity as the cam shaft in synchronization with the rotation of the cam shaft, a plurality of tooth portions 21A and 21B formed on an outer periphery of the second rotation body 21, and a pickup 22 for detecting the plurality of tooth portions 21A and 21B, and outputting signals in rectangular waveforms.

Then, the engine control means 10 determines, by reading and analyzing the signal output from the crank signal generation means 13 as well as the signal output from the cam signal generation means 11, which cylinder is in the compression stroke. A description is given of a specific determination method referring to a timing chart in FIG. 4.

In a case where the engine control means 10 detects the cam signal twice in the section between the one-tooth blanks, which are the crank signal reference positions, the crank position at the one-tooth blank can be identified as 165 degrees after the top dead center (ATDC) of the first cylinder. Moreover, in a case where the cam signal is not detected between these tooth blanks, the engine control means 10 can identify the crank position at the one-tooth blank as 525 degrees after the top dead center (ATDC) of the first cylinder.

Moreover, when the cam signal is not detected in the section between the one-tooth blank and the two-tooth blank, which are the crank signal reference positions, the engine control means 10 can identify the crank position at the two-tooth blank as 285 degrees after the top dead center (ATDC) of the first cylinder. Moreover, in a case where the cam signal is detected once between these tooth blanks, the engine control means 10 can identify the crank position at the two-tooth blank as 645 degrees after the top dead center (ATDC) of the first cylinder.

Moreover, in a case where the cam signal is detected once in the section between the two-tooth blank and the one-tooth blank, which are the crank signal reference positions, the engine control means 10 can identify the crank position at the one-tooth blank as 405 degrees after the top dead center (ATDC) of the first cylinder. Further, in a case where the cam signal is not detected between those tooth blanks, the engine control means 10 can identify the crank position at the one-tooth blank as 45 degrees after the top dead center (ATDC) of the first cylinder.

As described above, the engine control means 10 determines a cylinder of the engine based on the crank signal and the cam signal, and recognizes the crank position. Accordingly, based on this information, the engine control means 10 supplies the fuel, and ignites and burns the fuel, thereby properly operating the engine.

5. Engine Restart during Idle Stop

An idle-step mechanism according to the first embodiment automatically stops an engine in order to suppress a wasteful consumption of the fuel in a case where a vehicle is stopped for a short period such as a case where the vehicle waits for the traffic light to change, and automatically restarts the engine when a travel start command is issued (for example, when an acceleration pedal is depressed, or when a brake pedal is released). A detailed description is now given of control upon the restart while the engine is rotating.

Figure 5:
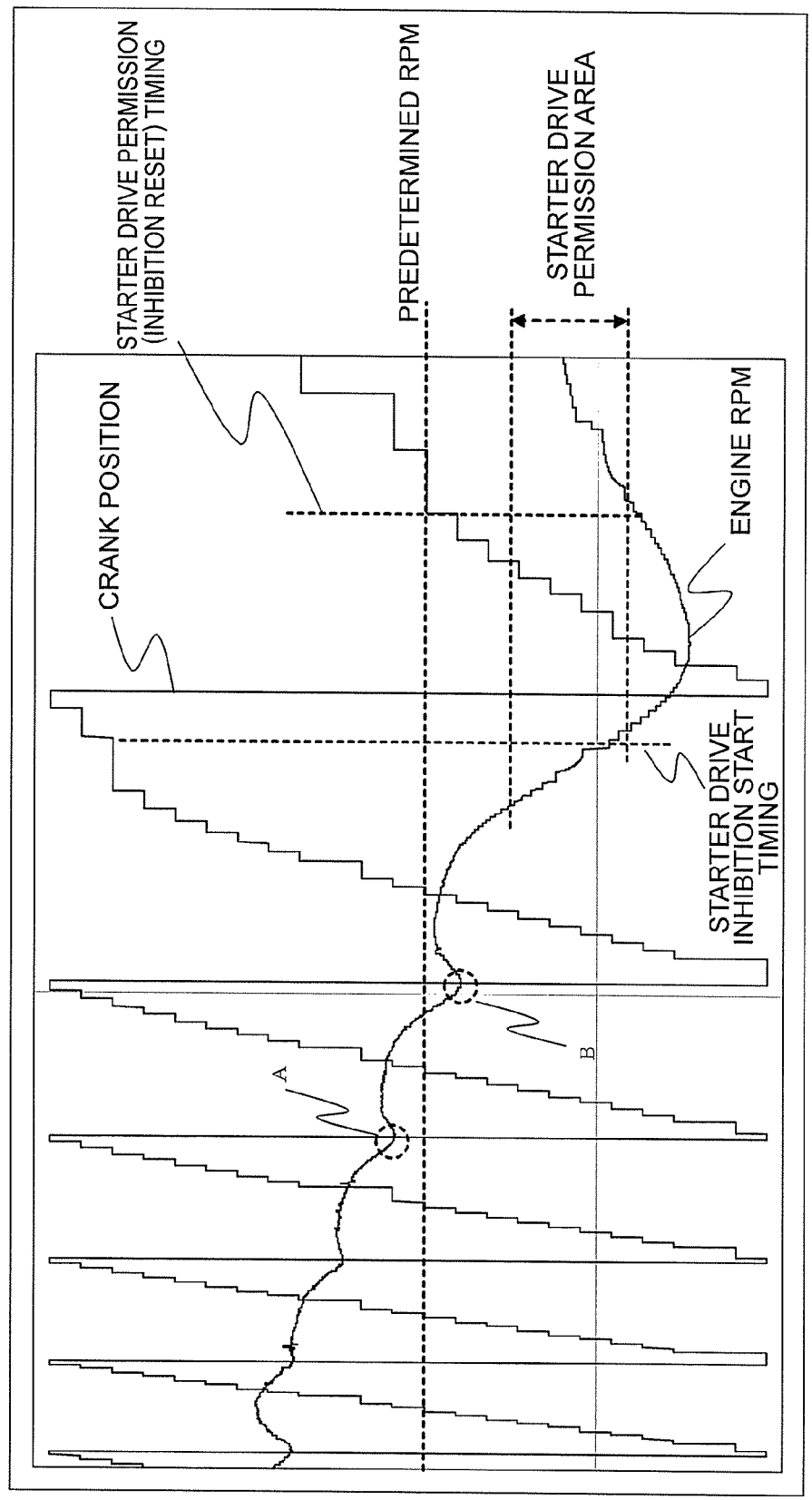
FIG. 5 is a time chart illustrating a relationship between a crank position and an engine rotation in an engine stop process according to the first embodiment of the present invention.

FIG. 5 is a time chart illustrating a relationship between the crank position and the engine rotation in an engine stop process according to the first embodiment of the present invention. Note that, a "starter drive permission area" illustrated in FIG. 5 indicates an area in which the engine can be started by driving the starter, controlling the pinion of the starter to protrude, meshing the ring gear of the engine and the pinion of the starter with each other, and transmitting the rotational force of a motor of the starter to the engine.

Points representing the engine rpm at a predetermined crank position (according to the first embodiment, a position of ATDC 5 degrees is set to the predetermined crank position, but the predetermined crank position only needs to be in a neighborhood of an inflection point of change in rotation, which presents a small change in rotation and can thus be precisely determined) are represented by A and B in FIG. 5.

Moreover, an rpm set in advance for determining whether or not the rpm at the predetermined crank position is a position before the backward rotation is represented as "predetermined rpm" in FIG. 5.

As a result, at the point of the predetermined crank position A, the engine rpm is not below the predetermined rpm, and hence the engine control means 10 can determine that, at the point of the next predetermined crank position B, the engine does not rotate backward yet. Further, at the point of the predetermined crank position B, the engine rpm is below the predetermined rpm, and hence the engine control means 10 can determine that, before the next predetermined crank position, the engine rotates backward.

On this occasion, the engine control means 10 can determine, based on a magnitude of the engine rpm at the point of the predetermined crank position B at which the determination that the engine rotates backward is made, a magnitude of the next backward rotation of the engine. Specifically, when the engine rpm is high (higher than a predetermined determination rpm) at the point of the predetermined crank position B, the rotational inertia of the engine is large, and the engine control means 10 can thus determine that the magnitude of the backward rotation of the engine is large. On the other hand, when the engine rpm is low (equal to or lower than a predetermined determination rpm) at the point of the predetermined crank position B, the engine control means 10 can determine that the magnitude of the backward rotation of the engine is small.

Further, the engine control means 10 in the engine starting device according to the first embodiment can include a first correction function for correcting the predetermined rpm based on a state of the vehicle which causes a change of a stopping behavior of the engine. With the first correction function, it is possible to improve a precision in determining whether or not to permit the drive of the starter.

The first correction function can correct the predetermined rpm by an rpm corresponding to the throttle opening as an example of the state of the vehicle. Specifically, when the throttle of the engine is open, a large amount of the air is taken into the cylinder, and hence a pulsation of the engine increases. Accordingly, the rpm at the predetermined crank position before the backward rotation increases. Conversely, when the throttle is closed, the air in the cylinder decreases, and hence the pulsation of the engine decreases. Accordingly the rpm at the predetermined crank position before the backward rotation decreases.

Thus, the first correction function in the engine control means 10 corrects the predetermined rpm N by the rpm $\Delta N$ corresponding to the throttle opening so as to obtain $N \pm \Delta N$ as the predetermined rpm after the correction. Similarly, the first correction function in the engine control means 10 can also properly correct the predetermined rpm based on the state of the vehicle by correcting based on the intake pressure of the engine in place of the throttle opening.

Moreover, the viscosity of an engine lubrication oil changes depending on the temperature, the fiction thus changes, and the rpm at the predetermined crank position before the backward rotation changes depending on an oil temperature and a water temperature. Therefore, the first correction function in the engine control means 10 can also correct the predetermined rpm based on the oil temperature and the water temperature as the state of the vehicle.

For example, when, with respect to the predetermined rpm N in a state in which the engine is sufficiently warmed up, the oil temperature and the water temperature of the engine are low, the viscosity of the engine lubrication oil is high, which constitutes a resistance against the rotation, and the predetermined rpm becomes higher than N. Thus, the first correction function in the engine control means 10 can correct the predetermined rpm N by the rpm $\Delta N$ corresponding to the water temperature and the oil temperature of the engine so as to obtain $N \pm \Delta N$ as the predetermined rpm after the correction.

Moreover, a rotational force is transmitted from a wheel shaft via the transmission to the engine, and hence depending on the vehicle speed, the rpm at the predetermined crank position before the backward rotation changes. Then, the first correction function in the engine control means 10 can correct the predetermined rpm based on the vehicle speed as the state of the vehicle.

For example, with respect to the predetermined rpm N when the engine stop command is issued in a state in which the vehicle speed is zero, if the engine stop command is issued in a state in which the vehicle speed is present, the rotational force is transmitted from the wheel shaft to the engine, and the predetermined rpm thus becomes lower than N. Therefore, the first correction function in the engine control means 10 can correct the predetermined rpm N by the rpm $\Delta N$ corresponding to the vehicle speed so as to obtain $N-\Delta N$ as the predetermined rpm after the correction.

Moreover, depending on a degree of the depression on the brake, the stop behavior of the engine changes, and hence, depending on a depressing force applied to the brake, the rpm at the predetermined crank position before the backward rotation changes. Therefore, the first correction function in the engine control means 10 can also correct the predetermined rpm based on the depressing force on the brake as the state of the vehicle.

For example, in a sudden braking in which the brake is depressed more than the normal braking, the wheel shaft stops faster, the engine rotation stops faster as well, and the predetermined rpm N increases. Thus, the first correction function in the engine control means 10 can correct the predetermined rpm N by the rpm $\Delta N$ depending on the depressing force on the brake or the depressing stroke so as to obtain $N \pm \Delta N$ as the predetermined rpm after the correction. Similarly, the first correction function in the engine control means 10 can also properly correct the predetermined rpm based on the state of the vehicle by correcting based on an acceleration G of the vehicle in place of the depressing force of the brake.

Moreover, depending on the speed reduction ratio of the transmission before the engine stop, the rotational force transmitted from the axle side to the engine changes, and hence, depending on the state of the transmission, the rpm at the predetermined crank position before the backward rotation changes. Therefore, the first correction function in the engine control means 10 can also correct the predetermined rpm based on the state of the transmission as the state of the vehicle.

For example, when the transmission is at a low gear ratio, which increases the torque of the engine, the force is more easily transmitted from the wheel shaft side to the engine. Conversely, at a high gear ratio, the force is hard to be transmitted from the wheel shaft side to the engine. Then, the first correction function in the engine control means 10 can correct the predetermined rpm, by correcting a correction rpm $\Delta N$ to $k\Delta N$ by a degree k of the transmission of the force from the wheel shaft side according to the gear ratio of the transmission so as to obtain $N \pm k \cdot \Delta N$ as the predetermined rpm after the correction.

Further, an electric power generation state of an alternator changes depending on an electric load, and the rpm at the predetermined crank position before the backward rotation thus changes depending on the electric load. Therefore, the first correction function in the engine control means 10 can also correct the predetermined rpm based on the electric load as the state of the vehicle.

For example, when an electric power generation amount is large, the engine stops faster, and hence the predetermined rpm N is higher than in the case where the electric power generation amount does not exist. Therefore, the first correction function in the engine control means 10 can correct the predetermined rpm N by the rpm ΔN corresponding to the electric power generation amount so as to obtain N±ΔN as the predetermined rpm after the correction. Similarly, the first correction function in the engine control means 10 can also properly correct the predetermined rpm based on the state of the vehicle by correcting based on a vehicle electric load in place of the electric load.

In the above description, the first correction function in the engine control means 10 corrects the predetermined rpm by adding/subtracting the correction amount, but the first correction function is not limited to this form. The first correction function includes all similar forms such as a form in which a state of the vehicle and the rpm after the correction are associated with each other in a map, and the map is stored in advance.

Further, in FIG. 5, a timing of a departure from the starter drive permission area is represented as "starter drive inhibition start timing". According to the first embodiment, the starter drive inhibition start timing is determined based on the crank position of the engine. Note that, the starter drive inhibition start timing can also be determined based on the rpm of the engine. Moreover, the starter drive inhibition start timing can also be determined based on an elapsed time from a time point of the predetermined crank position B.

Moreover, in FIG. 5, after the starter drive inhibition start timing, a point at which the engine rpm returns to the starter drive permission area is represented as "starter drive permission (inhibition reset) timing". According to the first embodiment, the starter drive permission (inhibition reset) timing is determined based on the crank position of the engine.

Note that, the starter drive permission (inhibition reset) timing may also be determined as a time point at which a predetermined period has elapsed from the starter drive inhibition start timing, or can also be determined based on an elapsed time from the time point of the predetermined crank position B. Moreover, the starter drive permission (inhibition reset) timing can also be determined based on the rpm of the engine. Further, the timings of the starter drive inhibition/permission (inhibition reset) may also be determined by combining those conditions.

Note that, according to the first embodiment, the timings of the starter drive inhibition/permission (inhibition reset) are set, based on the drive permission area of the starter, in consideration of a time lag between the start of the starter drive and the operation of the mechanical portion.

Figure 6:
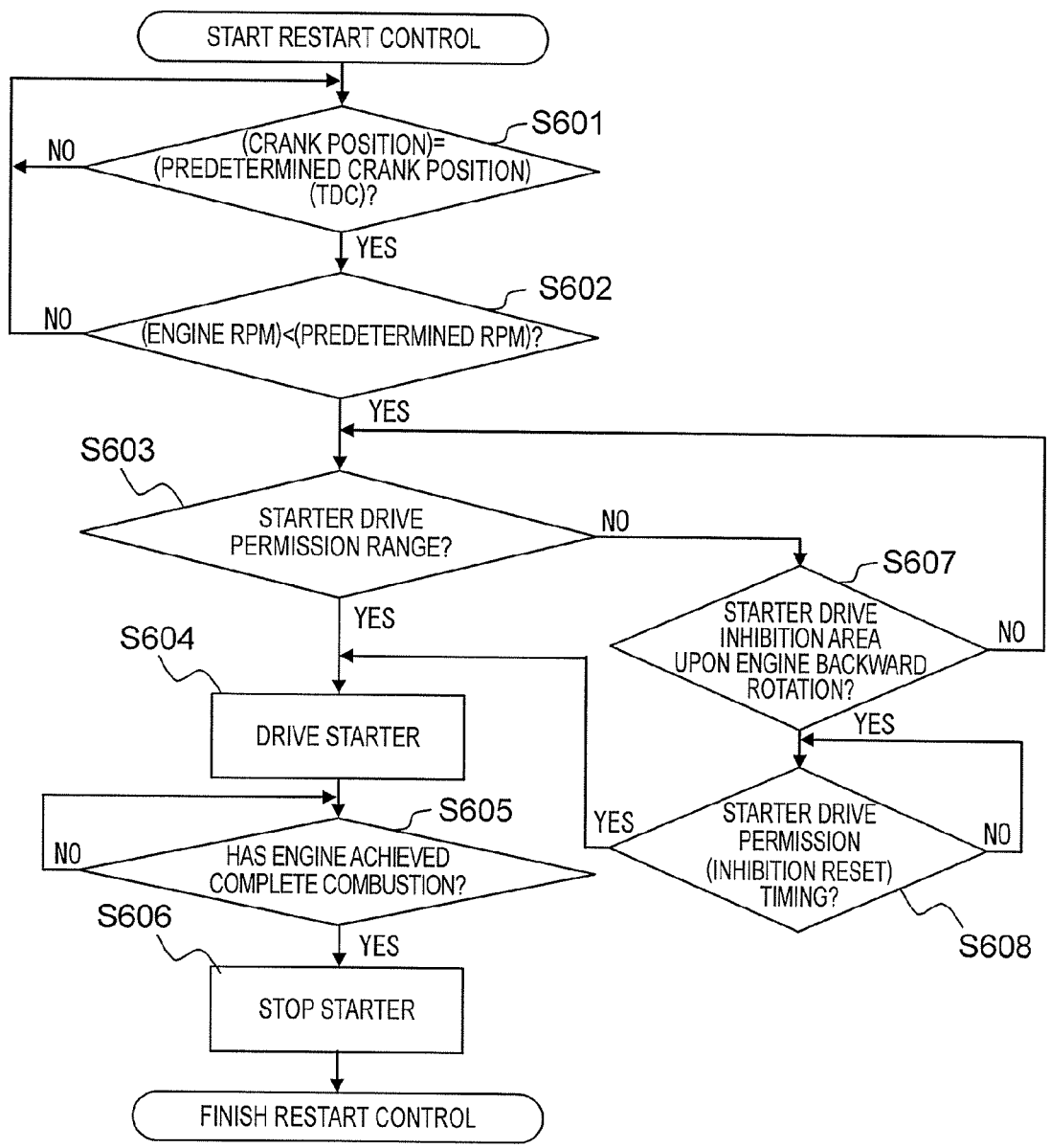
FIG. 6 is a flowchart illustrating engine restart control performed when the engine is stopping according to the first embodiment of the present invention.

A detailed description is now given of a restart control referring to a flowchart. FIG. 6 is the flowchart illustrating the engine restart control performed when the engine is stopping according to the first embodiment of the present invention. Specifically, FIG. 6 illustrates an operation, in the engine stop process, when the restart request is generated.

First, in Step S601, the engine control means 10 determines, based on the crank signal and the cam signal, whether or not the crank signal is at the predetermined crank position. Then, when the engine control means 10 determines that the crank signal is not at the predetermine crank position (NO in Step S601), the engine control means returns to Step S601, but when the engine control means 10 determines that the crank signal is at the predetermined crank position (YES in Step S601), the engine control means 10 proceeds to Step S602.

Then, in Step S602, the engine control means 10 determines whether or not the engine rpm at the predetermined crank position is lower than the predetermined rpm. Then, when the engine control means 10 determines that the engine rpm is not lower than the predetermined rpm (NO in Step S602), the engine control means 10 returns to Step S601, but when the engine control means 10 determines that the engine rpm is lower than the predetermined rpm (YES in Step S602), the engine control means 10 proceeds to the next Step S603.

Then, in Step S603, the engine control means 10 determines whether or not the engine rpm is in the drive permission range of the starter. Then, when the engine control means 10 determines that the engine rpm is in the drive permission range of the starter (YES in Step S603), the engine control means 10 proceeds to Step S604, and starts the power supply to the electromagnetic switch 14 of the starter.

The plunger 15 is attracted by the power supply to the coil 14a of the electromagnetic switch 14, thereby moving the pinion gear 17 via the lever 19 engaged with the plunger 15, and meshing the pinion gear 17 with the ring gear 12.

Moreover, the movement of the plunger 15 closes the contact 14b constituted inside the electromagnetic switch 14, the power is thus supplied to the motor 18, the pinion gear 17 is rotated, and the driving force of the motor 18 is transmitted to the engine.

Then, after starting the drive of the starter, the engine control means 10 proceeds to Step S605, and determines whether or not the engine has achieved complete combustion. Then, when the engine control means 10 determines that the engine has achieved complete combustion (YES in Step S605), the engine control means 10 proceeds to the next Step S606, and stops the starter to finish the restart control.

On the other hand, in the above-mentioned Step S603, the engine control means 10 determines that the engine rpm is out of the drive permission range (NO in Step S603), the engine control means 10 proceeds to Step S607. Then, in Step S607, the engine control means 10 determines whether or not the engine has entered the starter drive inhibition area upon the backward rotation, and when the engine control means 10 determines that the engine has not entered the starter drive inhibition area upon the backward rotation of the engine (NO in Step S607), the engine control means 10 returns to Step S603. On the other hand, when the engine control means 10 determines that the engine has entered the starter drive inhibition area upon the backward rotation of the engine (YES in Step S607), the engine control means 10 proceeds to the next Step S608.

Then, in Step S608, the engine control means 10 determines whether or not the starter drive permission (inhibition reset) timing has been reached. On this occasion, when the engine control means 10 determines that the drive is permitted (inhibition is reset) (YES in Step S608), the engine control means 10 proceeds to Step S604 to drive the starter and start the engine, and when the engine has achieved complete combustion (YES in Step S605), stops the starter (Step S606) to finish the restart control.

On the other hand, in the above-mentioned Step S608, when the control means determines that the drive is not permitted (inhibition is not reset) (NO in Step S608), the engine control means 10 returns to Step S608 to determine whether or not the starter drive is permitted (inhibition is reset).

The case where, in Steps S601 and S602, whether or not the rpm at the predetermined crank position is equal to or lower than the predetermined rpm is determined is described, but a case where, in an area equal to or lower than the predetermined rpm, whether or not the predetermined crank position is detected is determined is feasible, and a similar effect can be obtained.

As described above, according to the first embodiment, by determining whether or not the rpm at the predetermined crank position (for example, the TDC position of each cylinder) of the engine is equal to or lower than the predetermined rpm, before the backward rotation state of the engine occurs, the control to inhibit the drive of the starter is carried out. Thus, an excessive load is not imposed on the starter, and the starter can be prevented from being damaged. Further, transmission mechanisms of the starter and the engine ring gear can be prevented from being damaged.

Moreover, when the command to restart the engine is issued during the starter drive inhibition period, by determining whether or not the ring gear of the engine and the pinion gear can mesh with each other (for example, whether or not a predetermined period has elapsed after the establishment of the starter drive inhibition), the drive inhibition of the starter is reset, and the control to start the engine is carried out. Thus, before the engine completely stops, the engine can be started by driving the starter, thereby starting the engine earlier.

In the above-mentioned case where the state in which the ring gear of the engine and the pinion gear can mesh with each other is determined as the state in which the predetermined period has elapsed after the starter drive inhibition is established is described, but the state may also be determined as a state in which the rpm of the engine becomes equal to or less than a predetermined rpm.

Second Embodiment

In the above-mentioned first embodiment, the case where, in the engine restart control when the engine is stopping, the processing of comparing the rpm of the engine with the predetermined rpm is carried out is described. In contrast, according to a second embodiment, in the engine restart control when the engine is stopping, a description is given of a case where, instead of comparing the engine rpm with the predetermined rpm, processing of determining whether or not the engine rpm is in a predetermined rpm range is carried out.

Figure 7:
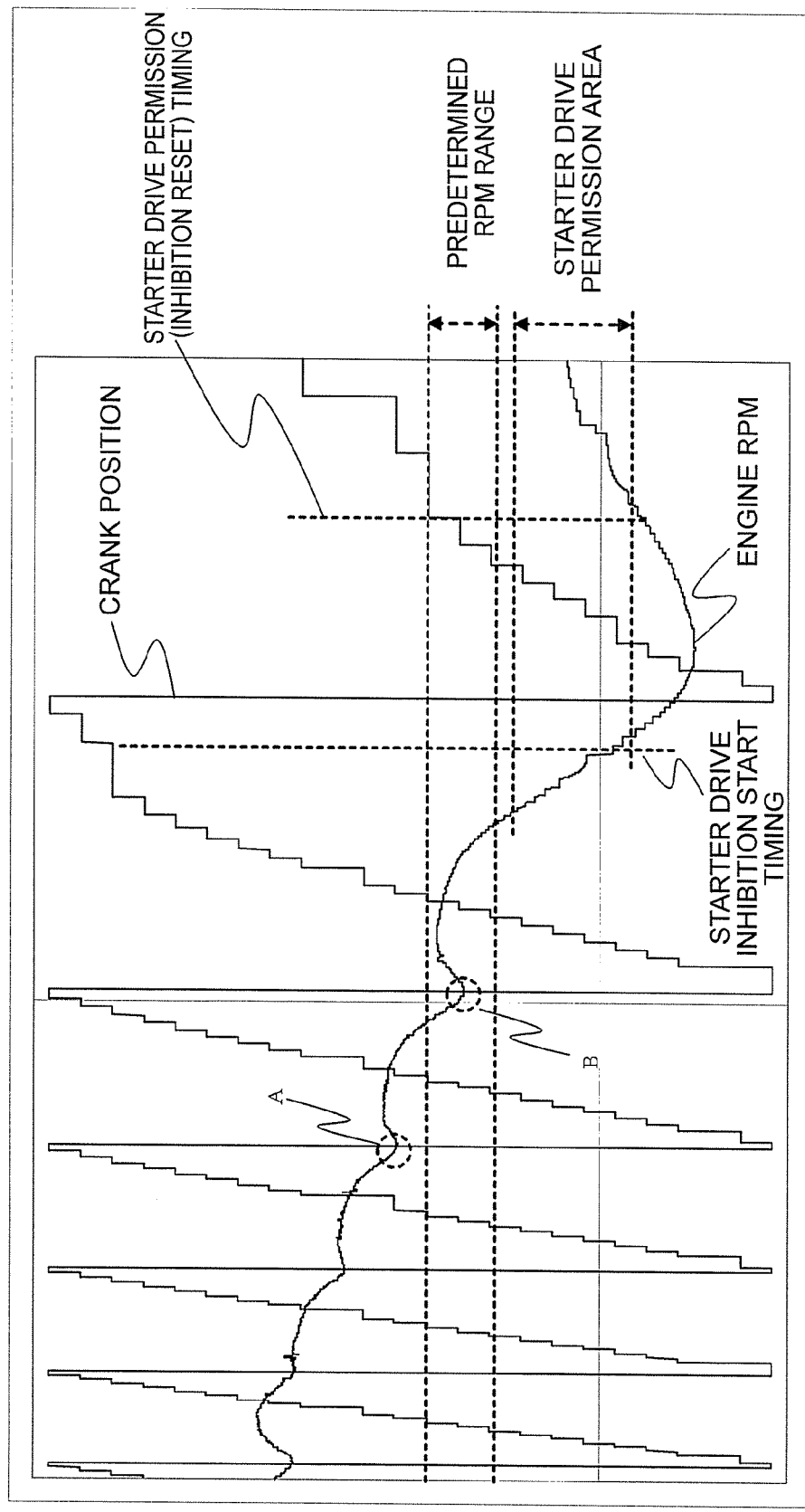
FIG. 7 is a time chart illustrating a relationship between the crank position and the engine rotation in the engine stop process according to a second embodiment of the present invention.
Figure 8:
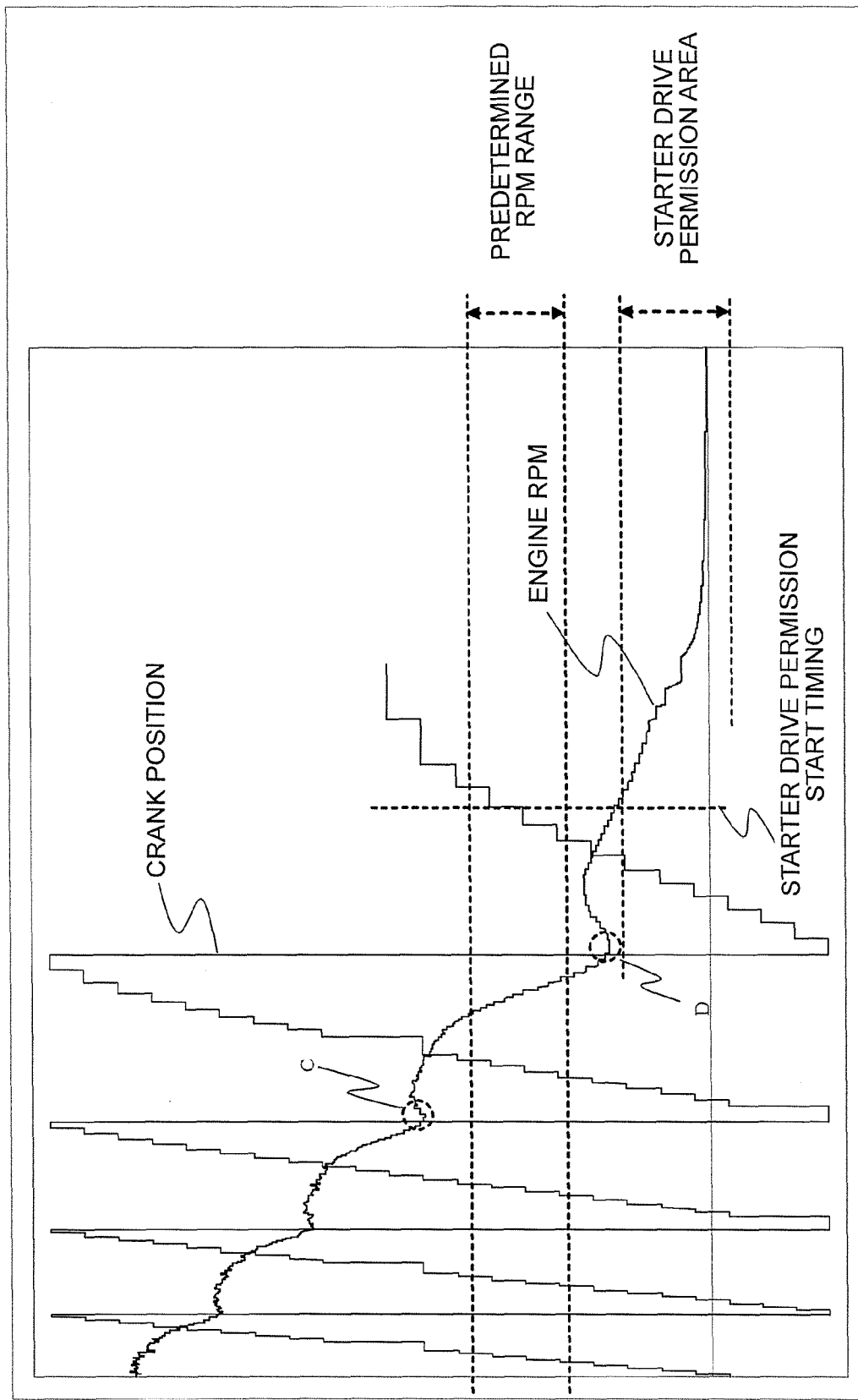
FIG. 8 is a time chart illustrating a relationship between the crank position and the engine rotation in the engine stop process according to the second embodiment of the present invention.

FIGS. 7 and 8 are time charts illustrating a relationship between the crank position and the engine rotation in an engine stop process according to the second embodiment of the present invention. More specifically, FIG. 7 illustrates a time chart for a case where a point B representing the engine rpm at the predetermined crank position is in the predetermined rpm range. In contrast, FIG. 8 illustrates a time chart for a case where a point D representing the engine rpm at the predetermined crank position is not in the predetermined rpm range and is lower than a lower limit of the predetermined rpm range.

A detailed description is now given of an operation in which a range is provided for the predetermined rpm as illustrated in FIGS. 7 and 8 referring to a flowchart. FIG. 9 is the flowchart illustrating the engine restart control performed when the engine is stopping according to the second embodiment of the present invention. Specifically, FIG. 9 illustrates an operation performed when, in the engine stop process, the restart request is generated. In FIG. 9, Step S601 and Steps S603 to S608 represent the same operation as in FIG. 6 of the above-mentioned first embodiment, and a description is mainly given below of Steps S901 and S902 in which the operation differs from the above-mentioned first embodiment.

In Step S901, the engine control means 10 determines whether or not the engine rpm at the predetermined crank position is in the predetermined rpm range. Then, when the engine control means 10 determines that the engine rpm is in the predetermined rpm range (which corresponds to the point B in FIG. 7) (YES in Step S901), the engine control means 10 proceeds to Step S603, and subsequently carries out the same operation as in the above-mentioned FIG. 6.

On the other hand, in Step S901, when the engine control means 10 determines that the engine rpm is out of the predetermined rpm range (NO in Step S901), the engine control means 10 proceeds to Step S902, and determines whether or not the engine rpm is lower than the lower limit of the predetermined rpm range. Then, when the engine control means 10 determines that the engine rpm is not lower than the lower limit of the predetermined rotation range (NO in Step S902), the engine control means 10 determines that the engine rpm is above an upper limit of the predetermined rpm range (corresponding to a point A in FIG. 7 and a point C in FIG. 8), and returns to Step S601.

On the other hand, in the above-mentioned Step S902, when the engine control means 10 determines that the engine rpm is lower than the lower limit of the predetermined rpm range (corresponding to the point D in FIG. 8) (YES in Step S902), the engine control means 10 proceeds to Step S603, and determines whether or not the drive of the starter is permitted.

As illustrated in FIG. 8, after the engine rpm passes the point D and once enters the drive permission range of the starter, after this timing, whenever the restart request is issued, the operation to start the engine can be started. The drive permission determination for the starter may be made based on the crank position, or the rpm of the engine, and similar determination can be made based on an elapsed time after the engine rpm decreases below the lower limit of the predetermined rpm range.

As described in the above-mentioned first embodiment, when the backward rotation of the engine is determined based on whether or not the engine rpm at the predetermined crank position is equal to or lower than the predetermined rpm, the backward rotation of the engine is taken into consideration, and the inhibition section (corresponding to a section in FIG. 5 from the starter drive inhibition timing to the starter drive permission (inhibition reset) timing) is thus generated.

In contrast, as in the second embodiment, by determining the backward rotation of the engine based on whether or not the engine rotation at the predetermined crank position is in the predetermined rpm range, when the engine rpm at the predetermined crank position is lower than the lower limit of the predetermined rpm range as illustrated in FIG. 8, it is no longer necessary to consider the backward rotation, and the engine can be started earlier.

The case where, in Steps S601, S901, and S902, whether or not the engine rpm at the predetermined crank position is in the predetermined rpm range, and whether or not the engine rpm is below the lower limit of the predetermined rpm range are determined is described. In contrast, in a region of the predetermined rpm range, whether or not the predetermined crank position is detected may be determined, and then, when the predetermined crank position is not detected in the predetermined rpm range, whether or not the crank position is detected in a range below the lower limit of the predetermined rpm range may also be determined, to thereby obtain a similar effect.

Further, the engine control means 10 in the engine starting device according to the second embodiment can include a second correction function for correcting, based on the rpm at the predetermined crank position, determination conditions for the permission of the drive of the starter (starter drive permission/inhibition timings). The engine control means 10 can precisely determine, by having the second correction function, whether or not the starter can be driven.

As described above, regarding the magnitude of the inverse rotation of the engine, when the engine rpm is high at the predetermined crank position, the rotational inertia of the engine is high, and hence the rpm of the backward rotation increases. Conversely, when the engine rpm is low at the predetermined crank position, the rpm of the backward rotation is low.

Therefore, when the rpm at the predetermined crank angle is high, the second correction function can correct, as follows, the determination conditions for whether or not the starter is driven. In other words, when the determination is based on the crank position, the second correction function in the engine control means 10 corrects, based on a fact that the change in the rotation of the engine is large when the engine rpm is high, the inhibition timing so as to be advanced, and corrects the permission timing so as to be delayed.

Moreover, when the elapsed time is used as the determination criterion, the second correction function in the engine control means 10 corrects the inhibition timing so as to decrease the elapsed period, and corrects the permission timing so as to decrease the elapsed time from the inhibition timing.

Moreover, when the engine rpm is used as the determination criterion, the second correction function in the engine control means 10 corrects, based on a fact that a change in the engine rotation is large when the engine rpm is high, the inhibition timing so as to increase the rpm, and corrects the permission timing so as to decrease the rpm.

Conversely, when the rpm at the predetermined crank position is low, the second correction function in the engine control means 10 makes a correction opposite to the correction described above. The engine control means 10 can precisely correct, by having the second correction function, the permission of the starter drive inhibition.

In the above description, the correction is carried out by increasing/decreasing the correction amount, but the second correction function is not limited to this form. The second correction function includes all similar forms such as a form in which values after correction based on the rpm at the predetermined crank position are mapped and stored in advance.

As described above, according to the second embodiment, by determining whether or not the rpm at the predetermined crank position (for example, the TDC position of the each cylinder) of the engine is in the predetermined rpm range, before the backward rotation state of the engine occurs, the control to inhibit the drive of the starter is carried out. Thus, an excessive load is not imposed on the starter, and the starter can be prevented from being damaged. Further, transmission mechanisms of the starter and the engine ring gear can be prevented from being damaged.

Moreover, when the command to restart the engine is issued during the starter drive inhibition period, by determining whether or not the ring gear of the engine and the pinion gear can mesh with each other (for example, whether or not a predetermined period has elapsed after the establishment of the starter drive inhibition), the drive inhibition of the starter is reset, and the control to start the engine is carried out. Thus, before the engine completely stops, the engine can be started by driving the starter, thereby starting the engine earlier.

Further, when the engine rpm at the predetermined crank position is not in the predetermined rpm range, and is below the lower limit of the predetermined rpm range, the backward rotation does not need to be considered, and the engine can thus be started earlier.

What is claimed is:

1. An engine starting device, comprising:
   crank signal generation means for outputting a crank signal including information indicating a reference position of a crankshaft of an engine; and
   engine control means for identifying, by determining the reference position based on the crank signal received from the crank signal generation means, a predetermined crank position of the crankshaft, and after stopping the engine when a stop condition for the engine is established, starting the engine when an engine restart condition is established,
   wherein the engine control means:
   estimates, in a course of stopping the engine when the stop condition for the engine is established, based on an engine rpm at the identified predetermined crank position, whether or not the engine rotates backward before reaching the predetermined crank position for a next time, and after estimating that the engine rotates backward, sets an inhibition range which is prescribed from a starter drive inhibition start timing to a starter drive inhibition reset timing, and a permission range which is other than the inhibition range, and when the restart condition is established during rotation of the engine, inhibits restart in the inhibition range and carries out the restart in the permission range;
   determines that the engine rotates backward before reaching the predetermined crank position for a next time, as a result of the engine control means determining that the engine rpm at the predetermined crank position is in the predetermined rpm range, in the course of stopping the engine when the stop condition for the engine is established, and sets the predetermined rpm range at a forward rotation range, and a lower limit of the predetermined rpm range at an rpm offset from 0 rpm; and
   determines that the engine does not rotate backward or, even when the engine rotates backward, the backward rotation is in the permission range as a result of the engine control means determining that the engine rpm at the predetermined crank position is not in the predetermined rpm range, and is below a lower limit of the predetermined rpm range, in the course of stopping the engine when the stop condition for the engine is established.

2. An engine starting device according to claim 1, wherein the engine control means estimates, based on the engine rpm at the predetermined crank position when the engine control means determines that the engine rotates backward, a magnitude of the engine rpm of the backward rotation, and corrects, depending on the estimated magnitude of the engine rpm of the backward rotation, the permission range and the inhibition range.

3. An engine starting device according to claim 1, wherein the predetermined crank angle comprises a neighborhood position of a TDC.

4. An engine starting device according to claim 1, wherein the engine control means calculates the engine rpm based on a cycle of the identified predetermined crank position of the crankshaft.

5. An engine starting device according to claim 1, wherein the engine control means calculates the engine rpm based on a change rate of a cycle of the identified predetermined crank position of the crankshaft.

6. An engine starting device according to claim 1, wherein the engine control means switches, depending on a position of the crankshaft, between a case where the engine rpm is calculated based on a cycle at the identified predetermined crank position of the crankshaft and a case where the engine rpm is calculated based on a change rate of the cycle at the identified predetermined crank position of the crankshaft.

7. An engine starting device according to claim 1, wherein the engine control means determines, after determining that the engine does not rotate backward or, even when the engine rotates backward, the backward rotation is in the permission range, in a predetermined timing, whether or not the restart is possible.

8. An engine starting device according to claim 1, wherein the starter comprises a type of starter which starts the engine by moving a pinion upon a start to mesh the pinion with an engine ring gear, and transmitting a rotational force of the starter to the engine, and in which the meshing between the pinion and the engine ring gear is released when the starter is not starting the engine.

9. An engine starting device, comprising:
crank signal generation means for outputting a crank signal including information indicating a reference position of a crankshaft of an engine; and
engine control means for identifying, by determining the reference position based on the crank signal received from the crank signal generation means, a predetermined crank position of the crankshaft, and after stopping the engine when a stop condition for the engine is established, starting the engine when an engine restart condition is established,
wherein the engine control means:
estimates, in a course of stopping the engine when the stop condition for the engine is established, based on an engine rpm at the identified predetermined crank position, whether or not the engine rotates backward before reaching the predetermined crank position for a next time, and after estimating that the engine rotates backward, sets an inhibition range which is prescribed from a starter drive inhibition start timing to a starter drive inhibition reset timing, and a permission range which is other than the inhibition range, and when the restart condition is established during rotation of the engine, inhibits restart in the inhibition range and carries out the restart in the permission range;
determines, in the course of stopping the engine when the stop condition for the engine is established, when the engine control means determines that the engine reaches the predetermined crank position in a state in which the engine rpm is in a predetermined rpm range, that the engine rotates backward before reaching the predetermined crank position for the next time, the predetermined rpm range is set at a forward rotation range, and a lower limit of the predetermined rpm range is set at an rpm offset from 0 rpm; and
determines that the engine does not rotate backward or, even when the engine rotates backward, the backward rotation is in the permission range as a result of the predetermined crank position not being detected in the predetermined rpm range and the predetermine crank position being detected when the engine rpm decreases below the lower limit of the predetermined rpm range, in the course of stopping the engine when the stop condition for the engine is established, when.

10. An engine starting device according to claim 9, wherein the engine control means determines, after determining that the engine rotates backward before reaching the predetermined crank position, in a predetermined timing, whether or not the restart is possible.

11. An engine starting device according to claim 10, wherein the engine control means estimates, one of when determining that the engine rotates backward, and when determining that the engine does not rotate backward or, even when the engine rotates backward, the backward rotation is in the permission range, based on the engine rpm at the predetermined crank position, a magnitude of the engine rpm of the backward rotation, and corrects, depending on the estimated magnitude of the engine rpm of the backward rotation, the predetermined timing.

12. An engine starting method to be applied to an engine starting device,
the engine starting device comprising:
crank signal generation means for outputting a crank signal including information indicating a reference position of a crankshaft of an engine; and
engine control means for identifying, by determining the reference position based on the crank signal received from the crank signal generation means, a predetermined crank position of the crankshaft, and after stopping the engine when a stop condition for the engine is established, starting the engine when an engine restart condition is established,
the engine starting method comprising:
estimating, by the engine control means, in a course of stopping the engine when the stop condition for the engine is established, based on an engine rpm at the identified predetermined crank position, whether or not the engine rotates backward before reaching the predetermined crank position for a next time;
after estimating that the engine rotates backward, setting, by the engine control means, an inhibition range which is prescribed from a starter drive inhibition start timing to a starter drive inhibition reset timing, and a permission range which is other than the inhibition range;
in the course of stopping the engine when the stop condition for the engine is established, when the restart condition is established during rotation of the engine, inhibiting, by the engine control means, restart in the inhibition range and carrying out the restart in the permission range;
in the course of stopping the engine when the stop condition for the engine is established, when the engine control means determines that the engine rpm at the predetermined crank position is in a predetermined rpm range, determining, by the engine control means, that the engine rotates backward before reaching the predetermined crank position for a next time, the predetermined rpm range is set at a forward rotation range, and a lower limit of the predetermined rpm range is set at an rpm offset from 0 rpm; and
in the course of stopping the engine when the stop condition for the engine is established, when the engine rpm at the predetermined crank position is not in the predetermined rpm range, and is below the lower limit of the predetermined rpm range, determining, by the engine control means, that the engine does not rotate backward or, even when the engine rotates backward, the backward rotation is in the permission range.

13. An engine starting method to be applied to an engine starting device,
the engine starting device comprising:
crank signal generation means for outputting a crank signal including information indicating a reference position of a crankshaft of an engine; and
engine control means for identifying, by determining the reference position based on the crank signal received from the crank signal generation means, a predetermined crank position of the crankshaft, and after stopping the engine when a stop condition for the engine is established, starting the engine when an engine restart condition is established, the engine starting method comprising:

estimating, by the engine control means, in a course of stopping the engine when the stop condition for the engine is established, based on an engine rpm at the identified predetermined crank position, whether or not the engine rotates backward before reaching the predetermined crank position for a next time;

after estimating that the engine rotates backward setting, by the engine control means, an inhibition range which is prescribed from a starter drive inhibition start timing to a starter drive inhibition reset timing, and a permission range which is other than the inhibition range;

in the course of stopping the engine when the stop condition for the engine is established, when the restart condition is established during rotation of the engine, inhibiting, by the engine control means, restart in the inhibition range and carrying out the restart in the permission range;

in the course of stopping the engine when the stop condition for the engine is established, when the engine control means determines that the engine reaches the predetermined crank position in a state in which the engine rpm is in a predetermined rpm range, determining, by the engine control means, that the engine rotates backward before reaching the predetermined crank position for the next time, the predetermined rpm range is set at a forward rotation range, and a lower limit of the predetermined rpm range is set at an rpm offset from 0 rpm, and in the course of stopping the engine when the stop condition for the engine is established, when the predetermined crank position is not detected in the predetermined rpm range and the predetermine crank position is detected when the engine rpm decreases below the lower limit of the predetermined rpm range, determining, by the engine control means, that the engine does not rotate backward or, even when the engine rotates backward, the backward rotation is in the permission range.

\* \* \* \* \*